United States Patent [19]

Kirschbaum

[11] Patent Number: 4,463,303
[45] Date of Patent: Jul. 31, 1984

[54] SIX POLE/EIGHT POLE SINGLE-PHASE MOTOR

[75] Inventor: Herbert S. Kirschbaum, Asheville, N.C.

[73] Assignee: Westinghouse Electric Corp., Pittsburgh, Pa.

[21] Appl. No.: 484,119

[22] Filed: Apr. 11, 1983

[51] Int. Cl.³ .............................................. H02P 7/48
[52] U.S. Cl. .................................... 318/776; 310/184
[58] Field of Search ............... 318/773, 774, 775, 776, 318/777; 310/184, 198–208

[56] References Cited

U.S. PATENT DOCUMENTS

| | | | |
|---|---|---|---|
| 2,820,938 | 3/1955 | Davies | 310/202 |
| 2,896,144 | 7/1959 | Mollenberg | 318/776 |
| 3,167,700 | 1/1965 | Neyhouse | 310/184 |
| 3,233,160 | 2/1966 | Rawcliffe | 318/776 |
| 3,619,730 | 11/1971 | Broadway | 318/776 |
| 3,619,748 | 11/1971 | Eastham | 318/774 |

Primary Examiner—G. Z. Rubinson
Assistant Examiner—Bentsu Ro
Attorney, Agent, or Firm—R. P. Lenart

[57] ABSTRACT

A single phase alternating current electric motor is provided with a main stator winding having two coil groups which are connected to form eight poles for eight-pole operation and to form six poles for six-pole operation. Each group contains four series connected coil elements with each element spanning approximately one-seventh of the periphery of the machine. The coil groups are spaced 180 mechanical degrees apart such that each end coil of one group overlaps one of the end coils of the other group. An auxiliary stator winding having two coil group with the same relative angular displacement as the main stator winding coil groups is included.

22 Claims, 10 Drawing Figures

SIX POLE/EIGHT POLE SINGLE-PHASE MOTOR

STATEMENT OF GOVERNMENT INTEREST

The United States Government has rights in this invention pursuant to Prime Contract No. W-7405-ENG-26 and Subcontract No. 86X-24712-C awarded by the United States Department of Energy.

BACKGROUND OF THE INVENTION

This invention relates to pole changing single phase alternating current rotary electric machines, and more particularly to pole changing induction motors having stator windings capable of being connected for six-pole or eight-pole operation.

Dual capacity heat pumps and air conditioning units require dual speed fan and blower motors. In conventional fan or blower motors, a booster winding is connected in series with the main stator winding to provide a reduced level of flux within the motor. This results in lower speed operation through an increase in slippage but also results in lower efficiency at low operating speeds.

Pole changing alternating current motors have been developed to operate at multiple speeds by alternatively providing different pole numbers according to a method of phase winding switching known as pole amplitude modulation. For example, U.S. Pat. No. 3,233,160 issued Feb. 1, 1966 to Rawcliffe, discloses a pole changing single-phase alternating current winding arrangement for a rotary electric machine comprising two windings for connection together to a single-phase alternating current supply to provide a running field for the machine, where each winding is wound for a first pole number and includes winding parts arranged for alternative connection in the circuit according to the method of pole amplitude modulation, to provide second and third pole numbers together in each winding considered independently. An additional starting winding is provided for connection to the singe-phase alternating current supply through a phase shifting means to produce a starting field for the machine. The first two stator windings are physically disposed for elimination of the third pole number from the running field. U.S. Pat. No. 3,619,730 issued Nov. 9, 1971 to Broadway et al., discloses a four pole/six pole motor having a four-pole auxiliary winding.

To minimize noise, heat pump and air conditioning units have been designed to include a six-pole or eight-pole fan motor for air movement in the outdoor unit. This invention provides a single-phase alternating current motor having a six pole/eight pole stator winding arrangement which is suitable for use in fan and blower applications.

SUMMARY OF THE INVENTION

A single-phase alternating current electric motor constructed in accordance with this invention comprises: a main stator winding including two identical coil groups placed 180 mechanical degrees apart, with each group having four series connected coils, wherein each end coil in one of the coil groups overlaps one of the end coils of the other coil group; means for connecting the two coil groups to form eight poles for eight-pole motor operation; and means for connecting the two coil groups to form six poles for six-pole motor operation, wherein one of the coil groups has a reversed polarity with respect to its connection for eight-pole operation. For example, the coil groups may be connected in series for eight-pole operation and in parallel for six-pole operation. An auxiliary winding is provided which is essentially a proportional duplicate of the main winding, although it may contain a different wire size and total number of turns. The auxiliary winding may be wound in space quadrature, on an eight-pole basis, with the main winding and connected to the power source through a phase shifting means such as a capacitor.

DESCRIPTION OF THE PREFERRED EMBODIMENT

Figure 1:
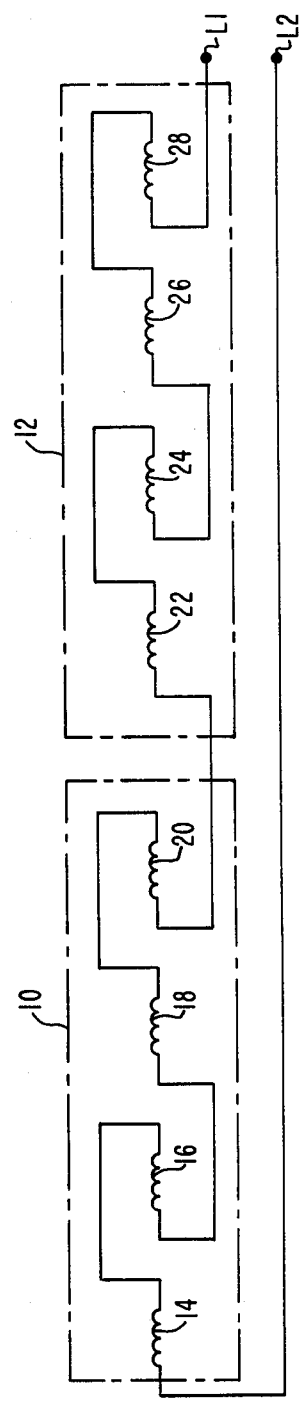
FIG. 1 is a schematic diagram of a main stator winding of a motor connected for eight pole operation in accordance with the present invention.

Referring to the drawings, FIG. 1 is a schematic diagram of a main stator winding of a motor constructed in accordance with the present invention. This winding is connected for eight-pole operation and includes two coil groups 10 and 12 connected in series between a pair of line terminals L1 and L2. Coil group 10 includes the series connection of four coils 14, 16, 18 and 20, while coil group 12 includes the series connection of coils 22, 24, 26 and 28. These coil groups have an identical winding layout and are disposed 180 mechanical degrees apart around the stator periphery. Each coil is wound to occupy approximately one-seventh of the periphery of the machine. Therefore, each end or flanking coil of each coil group overlaps one of the end or flanking coils of the other coil group.

Figure 2:
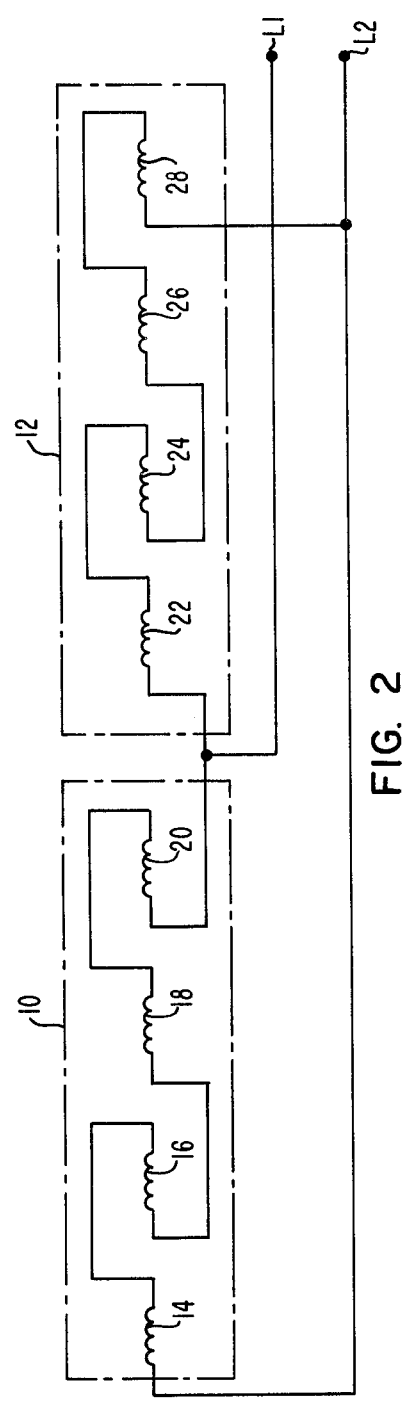
FIG. 2 is a schematic diagram of the main stator winding of FIG. 1 connected for six-pole operation.

FIG. 2 is a schematic diagram of the main stator winding of FIG. 1 connected for six-pole operation. In this arrangement, coil groups 10 and 12 are connected in parallel between line terminals L1 and L2, and coil group 12 has reversed polarity with respect to its connection for eight-pole operation in FIG. 1.

Figure 3:
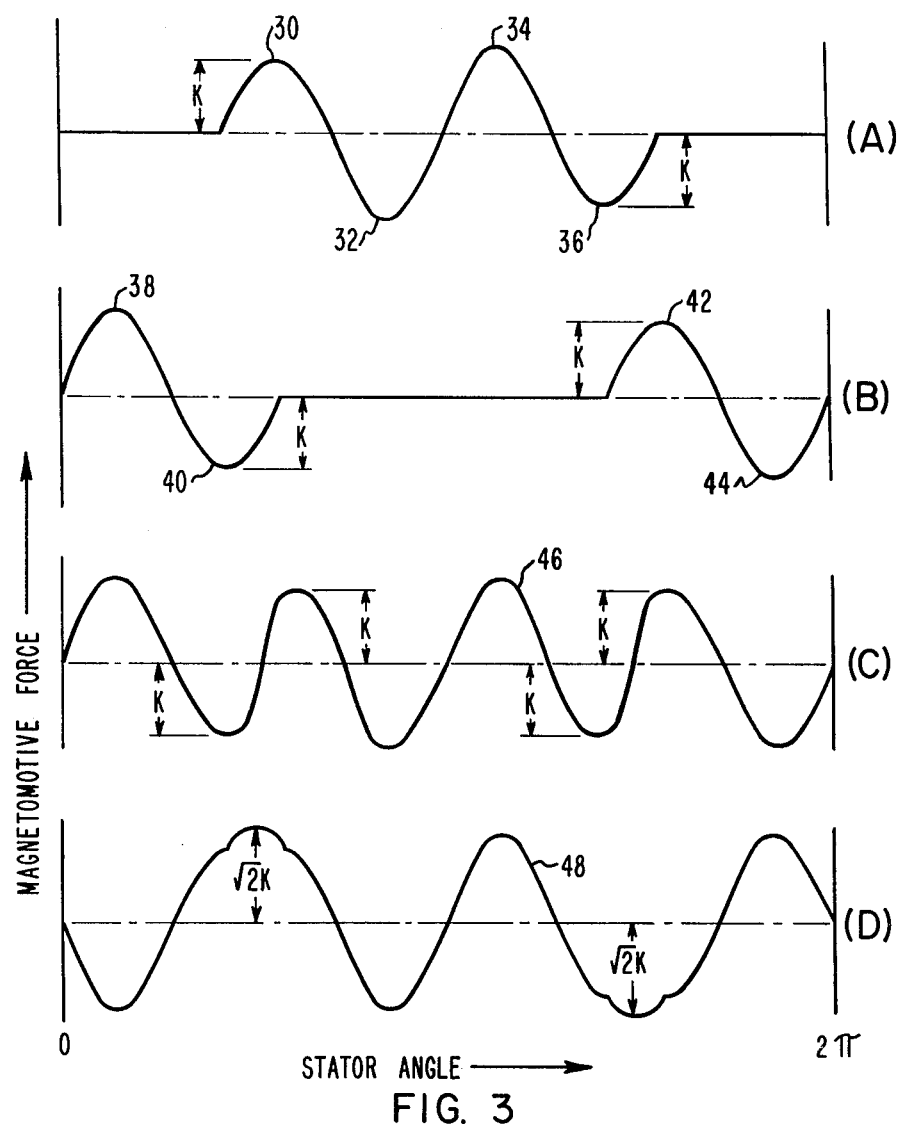
FIG. 3 is a series of waveforms illustrating the magnetomotive force produced by the windings of FIGS. 1 and 2, individually and in combination.

FIG. 3 is a series of waveforms illustrating idealized magnetomotive force distributions resulting from current flow through the main stator winding of FIGS. 1 and 2. Waveforms A and B illustrate magnetomotive force distributions resulting from stator coil groups 10 and 12 respectively. In these waveforms, magnetomotive force peaks 30 through 44 correspond to coil elements 14 through 28, respectively. Magnetomotive force distribution 46 of waveform C is the sum of waveforms A and B and is dominated by an eight-pole fundamental. Waveform C results from the series connection of coil groups 10 and 12. Magnetomotive force distribution 48 of waveform D is the difference between waveforms A and B and has a six-pole fundamental. Waveform D results from the parallel connection of coil groups 10 and 12 with the reversal of coil group 12. For this embodiment, magnetomotive force distribution peaks 32, 34, 38 and 44 have unity amplitude, while peaks 30, 36, 40 and 42 have some value other than unity designated as K in FIG. 3. In the eight-pole configuration illustrated by waveform C, the magnetomotive force distribution has a peak value of K in the vicinity of the overlap of coil groups 10 and 12, while the peak value is $\sqrt{2K}$ in the six-pole configuration illustrated by waveform D of FIG. 3. If one desires to equate the deviations from unity of the two peak magnetomotive forces, the value of K should be 0.822. If one desires to equate the deviation of the fluxes between the overlap region poles and the unity amplitude poles, the required value of K is approximately 0.696. Therefore, the number of turns in each flanking coil will be approximately 65% to 85% of the number of turns in each center coil. A compromise value of K equal to 0.76 will be used in the exemplary winding configuration discussed below.

Figure 4:
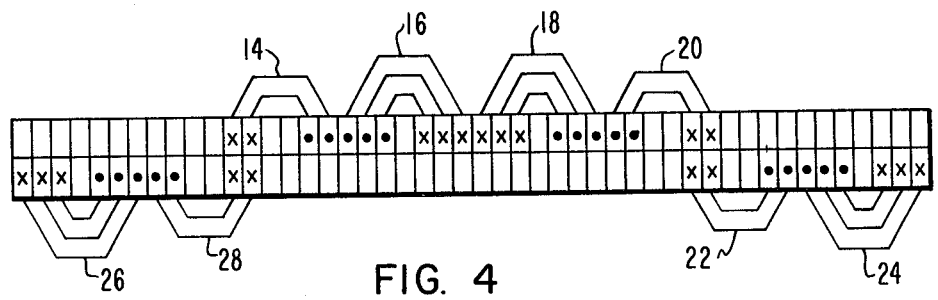
FIG. 4 is a wiring diagram of the main stator winding of a motor connected for eight-pole operation and constructed in accordance with one embodiment of this invention.

FIG. 4 is a wiring diagram for the main stator winding of FIG. 1 in a 48 slot stator. This winding is connected for eight-pole operation with the instantaneous current flow being designated by dots where current flows out of the sheet and by x's where the current flows into the sheet. This winding arrangement produces the magnetomotive force distribution 50 of FIG. 5 which has an eight-pole fundamental 52. Although each coil element 14 through 28 ideally spans one-seventh of the stator periphery, in an actual machine with a finite number of slots, it is not possible to exactly achieve a $2\pi/7$ pole span. If the 48 slots of the winding of FIG. 4 are divided by 7, a pole span of 6.857 slots results. Thus each of the pole windings ideally wound have to have a pole span of 6.857 slots. In actuality, the span would have to be either 6 slots or 7 slots. FIG. 4 utilizes a seven slot span for the central pair of poles in each coil group and a six slot span for the flanking pair of poles. That is, coils 16, 18, 24 and 26 span seven slots, while coils 14, 20, 22 and 28 span six slots. In this embodiment, the larger coils have a peak relative magnetomotive force of 2.0 with the conductors per slot sinusoidally graded from the pole edge inward at 44.5%, 35.5% and 20% of the total available conductors, respectively. The flanking coils have a total peak relative magnetomotive force of 1.52, which is 76% of 2.0. The conductors per slot are likewise sinusoidally graded from the pole edge inward at 61.8%, 31.2% and 0% of the total available conductors, respectively. The relative number of conductors per slot for the wiring diagram of FIG. 4 can be calculated with the extreme lefthand slot being designated as slot No. 1. For one ampere of coil current and a relative magnetomotive force of 2, the relative number of conductors in slots No. 1 and 7 will be 44.5% of 2.0 or 0.89. Similarly, the relative number of conductors in slots No. 2 and 6 is 0.71 and for slots 3 and 5, the relative number of conductors is 0.40. Slot No. 4 obviously has no conductors since it is in the exact center of coil 26. Slots No. 8 and 13 would have 61.8% of 1.52 or 0.94 relative conductors, while slots No. 9 and 12 would have 31.2% of 1.52 or 0.58 relative conductors. For this winding, slots 10 and 11 would have no conductors. This is in accordance with frequent practice where there are a pair of slots at the center of a coil and the conductors are sinusoidally graded. The contribution of a properly graded number of conductors placed in the central pair of slots to the fundamental component of the magnetomotive force is too small to warrant placing conductors in these slots.

Figure 6:
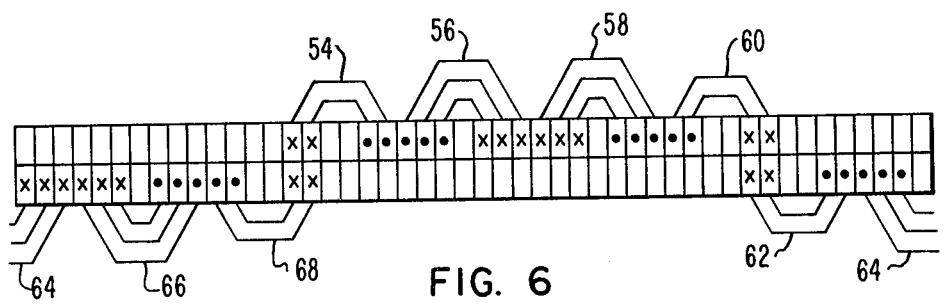
FIG. 6 is an auxiliary winding connected for eight-pole operation in accordance with one embodiment of this invention.

Several observations with regard to the wiring diagram of FIG. 4 can be made. The peripheral distance between the center of coils 26 and 28 is 6.5 slots, whereas one-seventh of the stator periphery is 6.857 slots. Furthermore, the pole span of coil No. 28 is 6 slots, which is further removed from 6.857 than would be 7 slots. The use of six slots versus seven slots is purely a matter of judgment, resulting in a somewhat better distribution factor for the six-pole field than otherwise. The number of conductors in each slot can be properly balanced against some selected performance criteria through the use of Fourier analysis. FIG. 6 is a wiring diagram for an auxiliary stator winding to be used in combination with the main stator winding of FIG. 4. This auxiliary stator winding is connected for eight-pole operation and includes two coil groups having the same relative angular displacement as the two coil groups of FIG. 4. The first coil group includes the series connection of coils 54, 56, 58 and 60, while the second coil group includes the series connection of coils 62, 64, 66 and 68. The auxiliary winding of FIG. 6 is wound in space quadrature with the main winding of FIG. 4 by being displaced three slots to the right, and may be wound in the same sinusoidally graded configuration and relative number of turns as the main stator winding.

Figure 7:
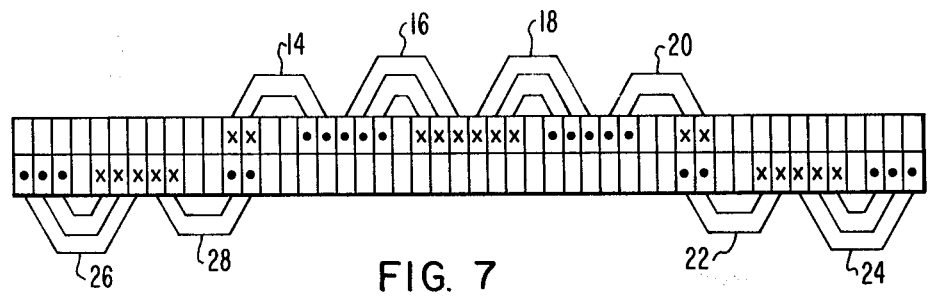
FIG. 7 is a wiring diagram of the winding of FIG. 4 connected for six-pole operation.
Figure 8:
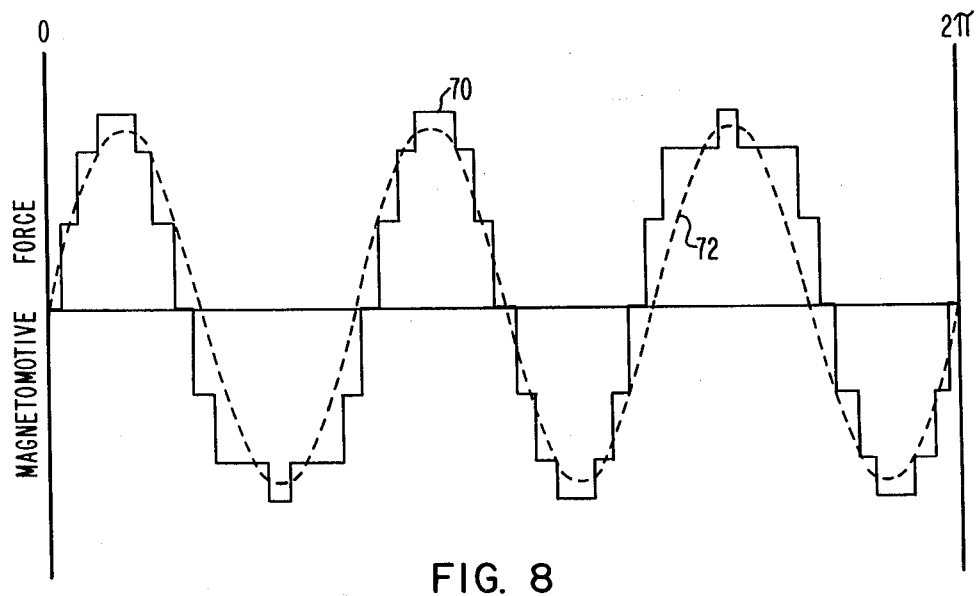
FIG. 8 is a waveform of the magnetomotive force produced by the winding of FIG. 7.
Figure 9:
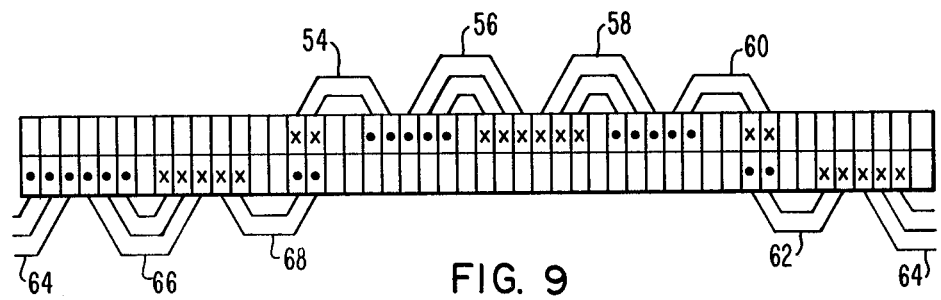
FIG. 9 is a wiring diagram of the auxiliary winding of FIG. 6 connected for six-pole operation.

FIG. 7 is a wiring diagram of the main stator winding of FIG. 2 connected for six-pole operation. This winding configuration produces the magnetic flux distribution 70 of FIG. 8 which has the six-pole fundamental 72. The main stator winding of FIG. 7 would be used in combination with the auxiliary stator winding of FIG. 9 which is also connected for six-pole operation and includes coils 54, 56, 58, 60, 62, 64, 66 and 68. The coils of the auxiliary winding of FIG. 9 are located in the same angular position as the coils of the auxiliary winding of FIG. 6.

For the two windings illustrated in FIGS. 4 and 7, the distribution factor for the eight-pole winding is 0.7921 and for the six-pole winding it is 0.6334. It should be noted that for a perfectly sinusoidal distributed winding, the distribution factor is $\pi/4$ or 0.7854, which indicates that the eight-pole field winding of FIG. 4 is quite close to being ideally distributed.

A motor constructed in accordance with one embodiment of this invention includes means for coil group reversal which results in the main stator winding coil groups being in parallel for six-pole operation and in series for eight-pole operation. Under these circumstances, the number of actual series conductors in the eight-pole connection will be twice those in the six-pole connection. When the distribution factors are taken into account, the ratio of the effective series conductors in the eight-pole configuration to those in the six-pole configuration is 2.5011. in either connection, the total induced voltages are approximately equal. Therefore, the ratio of the maximum air gap flux density in the six-pole configuration to that in the eight-pole configuration can be calculated to be 1.876.

If the motor were operated as a permanent split capacitor motor, the torque capability of the six-pole configuration would be about 3.5 times that of the eight-pole configuration. If it were operated as a pure single-phase machine in its six-pole configuration, its torque capability would probably be reduced to about 80 to 85% of that of a permanent split capacitor motor or about 2.8 to 3.0 of that of the eight-pole permanent split capacitor motor. For the speed ratio of the two machines, the ratio of the six-pole torque requirement to the four-pole torque requirement would be approximately 1.8. Therefore, in meeting blower load requirements for an eight-pole machine, the six-pole machine may be oversized from a torque point of view. However, viewed from a power point of view, there appears to be better balance. The volt ampere capability of the six-pole connection would be twice that of the eight-pole connection because of the paralleling of the stator coil groups. The shaft load requirements between the two connections are approximately in the tube ratio of 2.37:1, which is not far removed from 2.0:1 for the volt ampere capability needed to lead to a reasonably balanced design.

Figure 5:
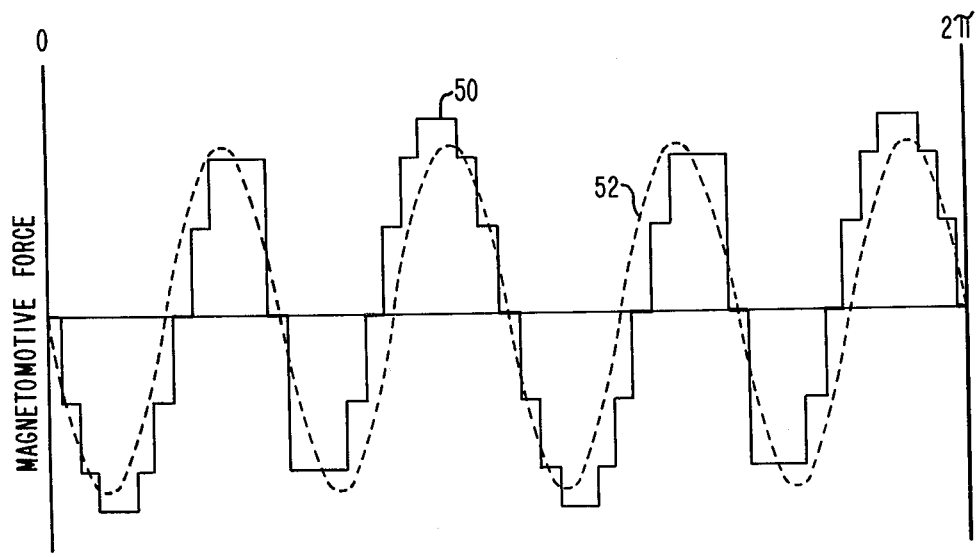
FIG. 5 is a waveform of the magnetomotive force generated by the winding of FIG. 4.

For a fan or blower motor heat pump application, the motor may operate a major portion of its operating hours in the low-speed configuration. Therefore, it is in this configuration that permanent split capacitor operation with a truly quadrature auxiliary winding is most desirable. Referring to FIGS. 4 and 5, a descending zero crossing of the fundamental magnetomotive force occurs at slot position 24½. With the auxiliary winding of FIG. 6, the auxiliary field has a descending zero crossing of the magnetomotive force at slot position 27½, which is displaced 90 electrical degrees along the periphery of the machine. This same auxiliary winding, if connected as a six-pole field, would still have a descending zero crossing of the field at slot position 27½ which is shifted from the main field of the winding of FIG. 7 by 67.5 electrical degrees along the periphery of the machine. While this is not a quadrature position, the motor can be made to operate satisfactorily by the proper selection of an auxiliary winding capacitor.

Figure 10:
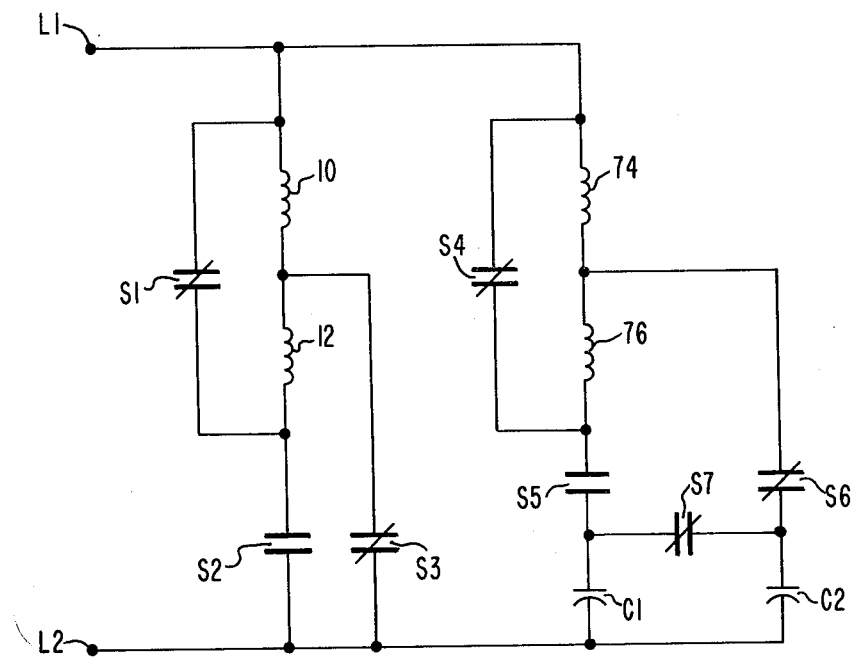
FIG. 10 is a schematic diagram of a single-phase alternating current motor stator coil circuit in accordance with one embodiment of this invention.

FIG. 10 is a schematic diagram of the stator winding circuit of a motor constructed in accordance with one embodiment of this invention. The main stator winding includes the series connection of coil groups 10 and 12, symbolically shown as a single coil, where each coil group has two center coils and two flanking coils as shown in FIG. 1. The auxiliary winding includes the series connection of coil groups 74 and 76, symbolically shown as a single coil, wherein each coil group includes the series connection of two center coils and two flanking coils having the same relative angular location as corresponding main stator winding coils but being displaced by 90 electrical degrees, on an eight-pole basis, around the stator periphery. A plurality of switches S1 through S7 are used to connect the coil groups of the main and auxiliary stator windings in series for eight-pole operation and in parallel for six-pole operation. The motor is connected for six-pole operation as shown in FIG. 10 with switches S1, S3, S4, S6 and S7 closed while switches S2 and S5 are open. In this configuration, main stator winding coil groups are connected in parallel with each other and between line terminals L1 and L2, while auxiliary stator winding coil groups 74 and 76 are connected in parallel with each other and in series with the parallel connection of capacitors C1 and C2 to form an auxiliary circuit which is connected between line terminals L1 and L2. For eight pole operation, switches S2 and S5 would be closed while the other switches are open. In this configuration, coil groups 10 and 12 of the main stator winding are connected in series with each other and between line terminals L1 and L2, while coil groups 74 and 76 of the auxiliary stator winding are connected in series with each other and in series with capacitor C1 to form an auxiliary circuit which is connected between line terminals L1 and L2. Alternatively, it will be apparent to those skilled in the art that different capacitors can be used such that only one capacitor is connected in the auxiliary stator winding circuit for each operating speed.

This invention also encompasses a motor having a main stator winding with two coil groups as described, in combination with an auxiliary winding which is wound for eight poles. In this case, the auxiliary winding would be used for starting purposes only. The machine would start with the main winding in the eight-pole configuration and when the machine has reached sufficient speed, the auxiliary winding may be opened so that the machine can run as a true eight-pole single-phase machine for low-speed operation, or the main winding can be switched to a six-pole configuration while the motor is running, for highspeed operation. A similar arrangement could be used with the auxiliary winding being wound for six poles.

While this invention has been described in terms of its preferred embodiments, it will be apparent to those skilled in the art that various changes or modifications may be made without departing from the invention. For example, the main stator winding coil groups 10 and 12 can be connected in either series or parallel to obtain both six- and eight-pole operation. Table I lists the possible connection configurations.

TABLE I

| | Stator Winding Configurations | |
|---|---|---|
| Configuration | Eight-Pole Group Connections | Six-Pole Group Connections |
| 1 | 10 and 12 in series | 10 and 12 in parallel (12 reversed) |
| 2 | 10 and 12 in series | 10 and 12 in series (12 reversed) |
| 3 | 10 and 12 in parallel | 10 and 12 in series (12 reversed) |
| 4 | 10 and 12 in parallel | 10 and 12 in parallel (12 reversed) |

It should be understood that wherever coil group 12 is shown to be connected for reversed polarity in Table I, it could be replaced by coil group 10. This would cause a reversal of rotation of the machine. In addition, the main and auxiliary windings need not be wound in a quadrature relationship since an external phase shifting device such as a capacitor could be used. It is therefore intended that the appended claims cover all such changes and modifications that may occur within the scope of the invention.

What is claimed is:

1. A single-phase alternating current electric motor comprising:
 a main stator winding including two identical coil groups spaced 180 mechanical degrees apart and each having four series connected, non-overlapping coils wherein each end coil in one of said coil groups overlaps one of the end coils of the other coil group;

each coil in said coil groups being wound to span approximately one-seventh of the motor periphery and being positioned such that the centers of said coils are approximately equally spaced around the motor periphery;

means for connecting said two coil groups to form eight poles for eight-pole motor operation; and means for connecting said two coil groups to form six poles for six-pole motor operation, wherein one of said coil groups has a reversed polarity with respect to its connection for eight-pole operation.

2. An electric motor as recited in claim 1, wherein each of said coil groups of said main stator winding comprises:

two center coils having the same number of turns and being adjacent to each other; and two flanking coils having the same number of turns and each being adjacent to one of said center coils, wherein the number of turns in each of said center coils is greater than the number of turns in each of said flanking coils.

3. An electric motor as recited in claim 2, wherein the number of turns in each of said flanking coils is equal to between 65% and 85% of the number of turns in each of said center coils.

4. An electric motor as recited in claim 1, wherein each of said coils is wound in a sinusoidally graded configuration.

5. An electric motor as recited in claim 1, further comprising:

an auxiliary stator winding including two identical coil groups spaced 180 mechanical degrees apart and each having four series connected, non-overlapping coils wherein the auxiliary stator winding coils have the same relative angular position as the coils of said main stator winding;

a first capacitor; and means for connecting said auxiliary stator winding coil groups to form eight poles and in series with said first capacitor for eight-pole motor operation.

6. An electric motor as recited in claim 5, further comprising:

a second capacitor; and means for connecting said auxiliary stator winding coil groups to form six poles and in series with said second capacitor for six pole motor operation.

7. An electric motor as recited in claim 5, wherein each coil of said auxiliary stator winding is displaced by 90 electrical degrees from a corresponding coil in said main stator winding, when connected to form eight poles.

8. An electric motor as recited in claim 5, wherein each of said coil groups of said auxiliary stator winding comprises:

two center coils having the same number of turns and being adjacent to each other; and two flanking coils having the same number of turns and each being adjacent to one of said center coils, wherein the number of turns in each of said center coils is greater than the number of turns in each of said flanking coils.

9. An electric motor as recited in claim 8, wherein the number of turns in each of said auxiliary flanking coils is equal to between 65% and 85% of the number of turns in each of said auxiliary center coils.

10. An electric motor as recited in claim 5, wherein each of said coils in said auxiliary stator winding is wound in a sinusoidally graded configuration.

11. An electric motor as recited in claim 1, wherein the overlapped portions of the end coils in a first one of said coil groups and the overlapped portions of the end coils in the other one of said coil groups conduct current in the same direction when connected for eight-pole operation and conduct current in opposite directions when connected for six-pole operation.

12. A single-phase alternating current electric motor comprising:

a main stator winding including two identical coil groups spaced 180 mechanical degrees apart and each having four series connected, non-overlapping coils wherein each end coil in one of said coil groups overlaps one of the end coils of the other coil group;

each coil in said coil groups being wound to span approximately one-seventh of the motor periphery and being positioned such that the centers of said coils are approximately equally spaced around the motor periphery;

means for connecting said two coil groups in series for eight-pole motor operation; and means for connecting said two coil groups in parallel for six-pole motor operation, wherein one of said coil groups has a reversed polarity with respect to its connection for eight-pole operation.

13. An electric motor as recited in claim 12, wherein each of said coil groups of said main stator winding comprises:

two center coils having the same number of turns and being adjacent to each other; and two flanking coils having the same number of turns and each being adjacent to one of said center coils, wherein the number of turns in each of said center coils is greater than the number of turns in each of said flanking coils.

14. An electric motor as recited in claim 13, wherein the number of turns in each of said flanking coils is equal to between 65% and 85% of the number of turns in each of said center coils.

15. An electric motor as recited in claim 12, wherein each of said coils is wound in a sinusoidally graded configuration.

16. An electric motor as recited in claim 12, further comprising:

an auxiliary stator winding including two identical coil groups spaced 180 mechanical degrees apart and each having four series connected, non-overlapping coils wherein the auxiliary stator winding coils have the same relative angular position as the coils of said main stator winding;

a first capacitor; and means for connecting said auxiliary stator winding coil groups in series with each other and in series with said first capacitor for eight-pole motor operation.

17. An electric motor as recited in claim 16, further comprising:

a second capacitor; and means for connecting said auxiliary stator winding coil groups in parallel with each other and in series with said second capacitor for six pole motor operation.

18. An electric motor as recited in claim 16, wherein each coil of said auxiliary stator winding is displaced by 90 electrical degrees from a corresponding coil in said main stator winding, when connected to form eight poles.

19. An electric motor as recited in claim 16, wherein each of said coil groups of said auxiliary stator winding comprises:

two center coils having the same number of turns and being adjacent to each other; and two flanking coils having the same number of turns and each being adjacent to one of said center coils, wherein the number of turns in each of said center coils is greater than the number of turns in said flanking coils.

20. An electrical motor as recited in claim 19, wherein the number of turns in each of said auxiliary flanking coils is equal to between 65% and 85% of the number of turns in each of said auxiliary center coils.

21. An electric motor as recited in claim 16, wherein each of said coils of said auxiliary stator winding is wound in a sinusoidally graded configuration.

22. An electric motor as recited in claim 12, wherein the overlapped portions of the end coils in a first one of said coil groups and the overlapped portions of the end coils in the other one of said coil groups conduct current in the same direction when connected for eight-pole operation and conduct current in opposite directions when connected for six-pole operation.

* * * * *